(12) United States Patent
Shiga et al.

(10) Patent No.: US 7,063,287 B2
(45) Date of Patent: Jun. 20, 2006

(54) MAGNETIC TAPE CARTRIDGE

(75) Inventors: Hideaki Shiga, Kanagawa-ken (JP);
Yusuke Ishihara, Kanagawa-ken (JP);
Kiyoo Morita, Kanagawa-ken (JP)

(73) Assignee: Fuji Photo Film Co., Ltd.,
Kanagawa-ken (JP)

( * ) Notice: Subject to any disclaimer, the term of this patent is extended or adjusted under 35 U.S.C. 154(b) by 0 days.

(21) Appl. No.: 10/345,176

(22) Filed: Jan. 16, 2003

(65) Prior Publication Data

US 2003/0098375 A1 May 29, 2003

Related U.S. Application Data

(62) Division of application No. 09/825,932, filed on Apr. 5, 2001, now Pat. No. 6,663,035.

(30) Foreign Application Priority Data

Apr. 5, 2000 (JP) ............... 2000-103259

(51) Int. Cl.
*G11B 23/107* (2006.01)

(52) U.S. Cl. .................. 242/348.2; 360/132

(58) Field of Classification Search ............ 242/348, 242/348.2; 360/132
See application file for complete search history.

(56) References Cited

U.S. PATENT DOCUMENTS 6,648,259 B1 * 11/2003 Shiga et al. ........... 242/348.2
6,663,036 B1 * 12/2003 Ishihara et al. ........ 242/348.2

FOREIGN PATENT DOCUMENTS

| EP | 0 924 703 A1 | 6/1999 |
|----|--------------|--------|
| EP | 0 926 675 A1 | 6/1999 |
| EP | 1 052 641 A1 | 11/2000 |
| EP | 1 104 930 A1 | 6/2001 |
| JP | 11-185435 A | 7/1999 |
| JP | 11-232826 A | 8/1999 |
| JP | 2000-036179 A | 2/2000 |
| WO | WO 99/67786 A1 | 12/1999 |
| WO | WO 00/10169 * | 2/2000 |
| WO | WO 00/10169 A1 | 2/2000 |
| WO | WO 00/31739 A1 | 6/2000 |
| WO | WO 00/49615 A1 | 8/2000 |

OTHER PUBLICATIONS

Abstract JP 11-232826 (Aug. 27, 1999) [see cite No. AI above].
Abstract JP 2000-036179 (Feb. 2, 2000) [see cite No. AJ above].

* cited by examiner

Primary Examiner—John Q. Nguyen
(74) Attorney, Agent, or Firm—Sughrue Mion, PLLC

(57) ABSTRACT

Disclosed herein is a magnetic tape cartridge including a cartridge case. In the cartridge case, a single reel with magnetic tape wound thereon is rotatably housed, and a leader pin coupled with a leading end of the magnetic tape is caught by a pin catching member of a recording-reproducing unit and is inserted into a tape leader opening formed in the cartridge case. The magnetic tape cartridge also includes a pin retaining spring member which elastically engages the leader pin so that the leader pin is detachably retained at a predetermined position within the cartridge case. Furthermore, a wall surface is provided in the cartridge case so that when the leader pin is inserted into the cartridge case, displacement of the pin retaining member due to the engagement of the pin retaining member with the leader pin is regulated within a predetermined range.

13 Claims, 20 Drawing Sheets

F I G. 11
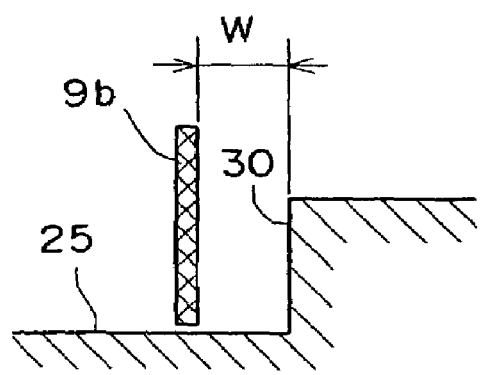

F I G. 12
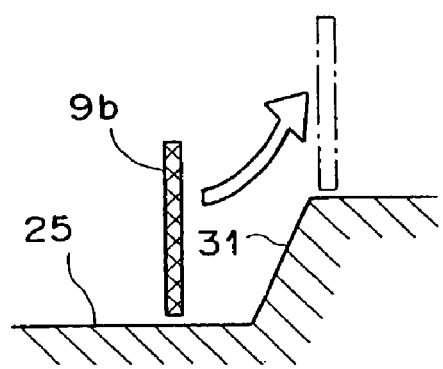

F I G .13
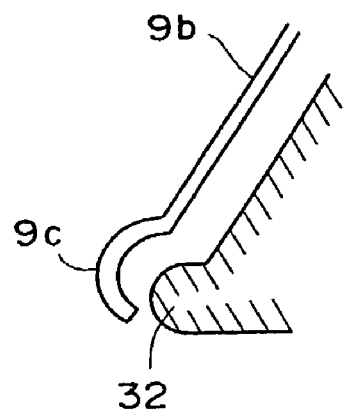

F I G . 15
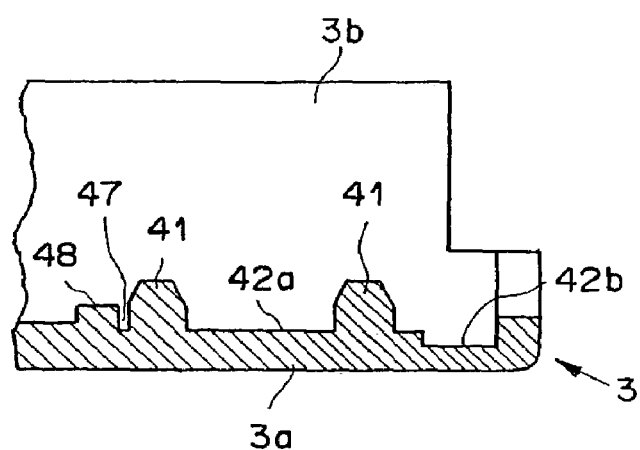

F I G . 18
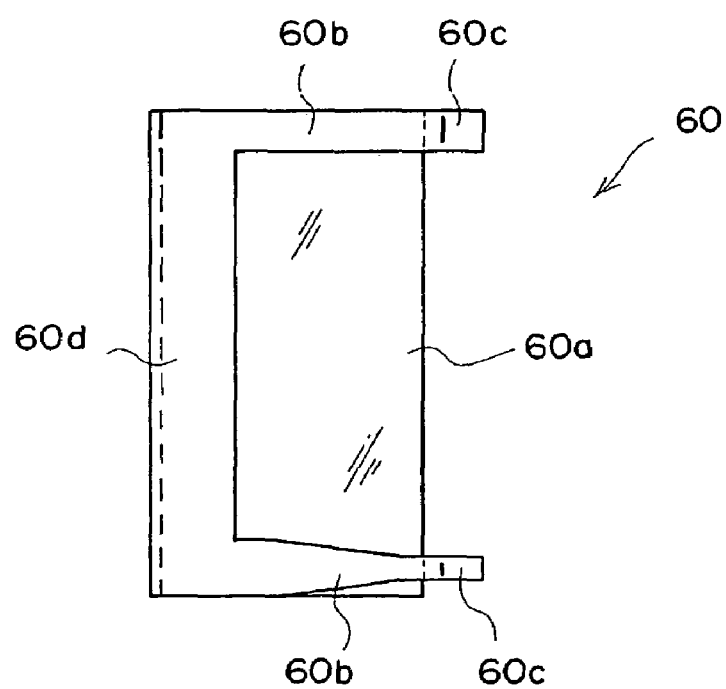

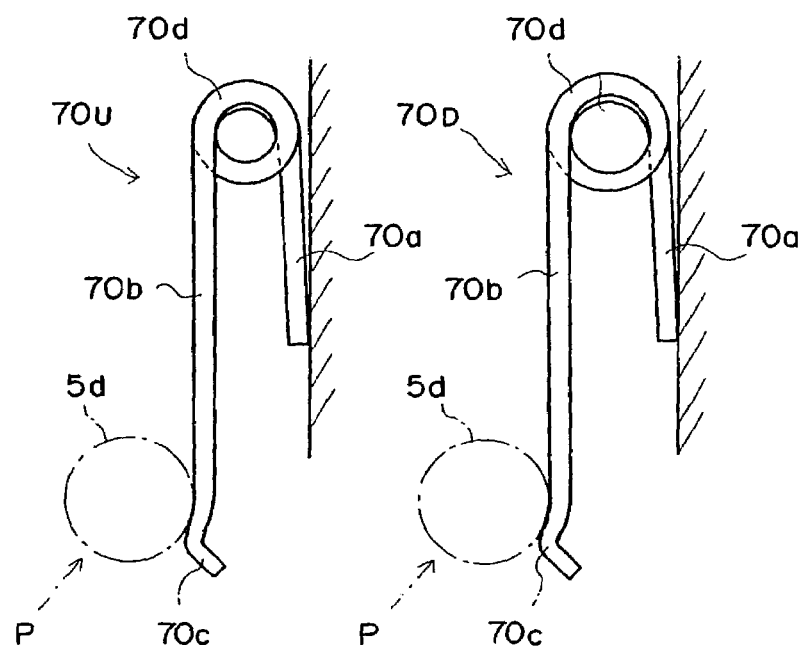

MAGNETIC TAPE CARTRIDGE

This is a division of application Ser. No. 09/825,932 filed Apr. 5, 2001, now U.S. Pat. No. 6,663,035 the entire disclosure of which is incorporated herein by reference.

BACKGROUND OF THE INVENTION

1. Field of the Invention

The present invention relates to a magnetic tape cartridge, in which a single tape reel with magnetic tape wound thereon is rotatably housed within a cartridge case and a tape leader pin is coupled with the leading end portion of the magnetic tape.

2. Description of the Related Art

In the magnetic tape cartridges, which are used as storage medium to be employed in external storage units for computers, etc., there is known a type where a single tape reel with magnetic tape wound thereon is rotatably housed within a cartridge case. This magnetic tape is employed as a data archiving tape for computers, etc., and stores important information. For this reason, the magnetic tape cartridge is constructed so that trouble, such as tape jamming, etc., does not occur and that the magnetic tape is not pulled out from the cartridge case unexpectedly.

Also, a tape leader pin is coupled to the leading end of the magnetic tape. When this magnetic tape cartridge is loaded into a recording-reproducing unit, a pin catching member on the side of the recording-reproducing unit engages the tape leader pin and pulls out the magnetic tape from the cartridge case. On the other hand, when the magnetic tape cartridge is unloaded from the recording-reproducing unit, the magnetic tape is wound on the reel and the tape leader pin is returned into the cartridge case by the pin catching member. The tape leader pin is detachably retained in a predetermined position, by a pin retaining spring member provided within said cartridge case so that it faces the tape leader opening of the cartridge case.

The aforementioned tape leader pin is illustrated in FIG. 1A. This tape leader pin P and magnetic tape T are coupled with each other, as illustrated in FIG. 1B. The tape leader pin P is constructed of a pin main body 5 and a clamp member 6, as disclosed in Japanese Unexamined Patent Publication No. 11(1999)-232826. The pin main body 5 is formed, for example, from stainless steel and consists of a tape clamp portion 5a interposed between a pair of inner flange portions 5b, small-diameter portions 5c formed outside the inner flange portions 5b, and outer flange portions 5d formed outside the small-diameter portions 5c. The clamp member 6 is formed, for example, from synthetic resin. This clamp member 6 is equipped with an axial slit 6a and has a C-shaped cross section. The clamp member 6 is inserted elastically on the tape clamp portion 5a of the pin main body 5, and magnetic tape T is clamped between the clamp member 6 and the tape clamp portion 5a.

FIG. 2 illustrates a conventional magnetic tape cartridge disclosed in Japanese Unexamined Patent Publication No. 2000-36179. Note that in FIG. 2, the right side in the figure is the front side of the cartridge case, because the cartridge case is inserted toward the right side when it is loaded into a recording-reproducing unit.

In this magnetic tape cartridge, a single tape reel (not shown) with magnetic tape T coupled at its leading end with a tape leader pin P is rotatably housed within a cartridge case 4 consisting of an upper case (not shown) and a lower case 3 fastened together by means of small bolts, etc. A tape leader opening 10 for leading the magnetic tape T is formed in one side wall of the cartridge case 4. This tape leader opening 10 is constructed so that it is opened and closed by a slide door (not shown) urged in a closing direction with a spring member (not shown).

The tape leader pin P, coupled with the leading end of the magnetic tape T, and having construction such as that shown in FIG. 1, is inserted in and out of the magnetic cartridge through the tape leader opening 10. The top and bottom walls inside the tape leader opening 10 are provided with pin housing recesses 45 into which the upper and lower flange portions 5d of the leader pin main body 5 are inserted. Also, there is formed an insertion guide portion 21 extending linearly from the pin housing recess 45 toward the tape leader opening 10.

A pin retaining member 50, for detachably retaining the tape leader pin P in the pin housing recess 45, is formed from a plate spring member having a hairpin-shaped cross section. The pin retaining member 50 has an attaching plate portion 50a which extends vertically between the upper and lower cases. The attaching plate portion 50a is clamped between (1) bosses 41 provided on the bottom surface of the top wall of the upper case and the top surface of the bottom wall of the lower case 3 along the inside surface of the case side wall 3b, and (2) the side wall 3b. The pin retaining member 50 further has a pair of upper and lower elastic arm portions 50b which extend from the upper and lower ends of the proximal portion 50d of the attaching portion 50a toward the tape leader opening 10. The outer end portions of the upper and lower elastic arm portions 50b are formed into pin retaining portions 50c, which abut the outer peripheral surfaces of the upper and lower flange portions 5d of the leader pin main body 5.

On the other hand, the pin housing recess 45 of the cartridge case 4 has an abutting surface in the form of a circular arc which receives the outer peripheral surface of the flange portion 5d of the leader pin main body 5. However, the right side portion, on the side of the pin retaining member 50, of the abutting surface has been removed in order to assure installation space for the elastic arm portions 50b and pin retaining portions 50c of the pin retaining member 50.

The tape leader pin P retained in the pin housing recess 45 is pulled out of the cartridge case 4 by a pin catching member 80, called a leader block, which is provided on the side of a recording-reproducing unit. The pin catching member 80 has an engagement cutout 80a which engage with the upper and lower small-diameter portions 5c (see FIG. 1) of the leader pin main body 5. When the engaging operation is performed, the pin catching member 80 first moves linearly in the direction of arrow A toward the tape leader opening 10 and enters the tape leader opening 10 through a side opposite to the case side wall 3b with respect to the tape leader pin P. Then, the outer end of the pin catching member 80 rotates in the direction of arrow B toward the tape leader pin P. The engagement cutout 80a of the pin catching member 80 is caught on the small-diameter portion 5c of the tape leader pin P and is moved back in the direction of arrow C. As a result, the tape leader pin P is pulled out of the cartridge case 4 through the tape leader opening 10. In this manner, the mechanism of the recording-reproducing unit is simplified.

On the other hand, when the magnetic tape cartridge is taken out from the recording-reproducing unit, the pin catching member 80 holding the tape leader pin P advances linearly toward the tape leader opening 10 in the direction opposite to the direction of arrow C. After the tape leader pin P has been retained in the pin housing recess 45, the pin catching member 80 is returned via the tape leader opening 10 along the reverse route of the aforementioned route.

In the tape leader pin P of FIG. 1, incidentally, there is a possibility that the tape leader pin P will be disengaged from the magnetic tape T because of insufficient clamping force, since the coefficient of friction between the magnetic tape T and the pin main body 5 (or the clamp member 6) is low. More specifically, in order to reduce the sliding friction between the magnetic tape T and the magnetic head, a lubricating agent is often coated on the magnetic layer or top surface of the magnetic tape T so that the coefficient of friction is reduced. Similarly, a lubricating agent is coated on the bottom surface of the magnetic tape T. In that case, the coefficient of friction between the pin main body 5 (or the clamp member 6) formed from stainless steel and the magnetic tape T varies with the type of the magnetic tape T. When this coefficient of friction is small, there are cases where the clamping force by the insertion of the clamp member 6 onto the tape leader pin P is reduced.

In addition, when the tape leader pin P is held and pulled out of the tape leader opening 10 of the cartridge case 4 by the pin catching member 80, as described above, the pin catching member 80 is inserted into the tape leader opening 10 in the direction of arrow A and is then rotated in the direction of arrow B to catch the tape leader pin P. For this reason, there is a problem that engagement between the pin catching member 80 and the tape leader pin P cannot be reliably performed, because the tape leader pin P is pushed and moved by the pin catching member 80 when the pin catching member 80 rotates in the direction of arrow B and engages the tape leader pin P.

That is, when the pin catching member 80 rotates in the direction of arrow B and engages the tape leader pin P, there are cases where force is exerted on the tape leader pin P in the direction of arrow B by the pin catching member 80. In such a case, since the right side portion of the abutting surface of the housing recess 45 has been removed, the spring force of the pin retaining member 50 cannot resist the rightward force exerted on the tape leader pin P and therefore the tape leader pin P will be moved out of the pin housing recess 45 or will tilt. As a result, there is a fear that the pin catching member 80 cannot engage the tape leader pin P correctly and the loading operation will not be performed with reliability.

Hence, it has been proposed to provide an abutting portion on a side near the pin retaining member to receive the flange portion 5d of the tape leader pin P and regulate movement of the tape leader pin P during engagement. However, in that case, space for installing the pin retaining member is narrowed, so it becomes difficult to install the hairpin-shaped pin retaining member 50 equipped with the long elastic arm portion 50b.

To solve this problem, a pin retaining member with a relatively short elastic arm portion can be employed. In that case, if the retaining portion of the outer end of the elastic arm portion of the pin retaining member is forcibly pushed by the tape leader pin P when the tape leader pin P is inserted into the pin housing recess 45 during the unloading operation, there is another problem that plastic deformation will occur near the boundary portion between the attaching portion and short elastic arm portion of the pin retaining member and therefore the short elastic arm portion will no longer return to the original position.

Furthermore, as described in the aforementioned Japanese Unexamined Patent Publication No. 11(1999)-232826, there is a magnetic tape cartridge having separate pin retaining members. The pin retaining members are respectively equipped with elastic arm portions and are independently installed in the upper and lower cases. However, the elastic arm portions of the pin retaining members are equipped at their outer ends with angled pin-retaining portions for retaining the flange portions 5d of the pin leader pin P, and the upper and lower elastic arm portions and pin retaining portions are approximately the same in shape. Because of this, the upper and lower pin retaining members are approximately the same in spring characteristic.

Therefore, when the tape leader pin P is returned into the cartridge case by a pin catching member provided on a drive unit, the upper and lower flange portions 5d of the tape leader pin P are brought into contact with the pin retaining portions of the pin retaining members at approximately the same time and are subjected to approximately the same elastic force. Because of this, the tape leader pin P will be caught on the pin retaining portions and therefore smooth engagement between the tap leader pin P and the pin retaining members will be disturbed.

SUMMARY OF THE INVENTION

The present invention has been made in view of the aforementioned circumstances. Accordingly, it is a first important object of the present invention is to provide a magnetic tape cartridge that is capable of enhancing a force of clamping the leading end portion of magnetic tape to a tape leader pin to assure reliability.

A second important object of the invention is to provide a magnetic tape cartridge which is capable of preventing plastic deformation of a pin retaining member during an unloading operation, while assuring a reliable loading operation by preventing movement of a tape leader pin when a pin catching member engages the tape leader pin during a loading operation A third important object of the invention is to provide a magnetic tape cartridge which is capable of performing smooth engagement between a tape leader pin and a pin retaining member by preventing a pin catching member from being caught on the pin retaining member when the tape leader pin is returned into a cartridge case.

To achieve the aforementioned objects and in accordance with the present invention, there is provided a first magnetic tape cartridge comprising: a cartridge case; a single reel rotatably housed in the cartridge case, the reel having magnetic tape wound thereon; and a leader pin, coupled with a leading end of the magnetic tape, for leading the magnetic tape;

wherein the leader pin has both a pin main body equipped with a tape clamp portion on which the leading end of the magnetic tape is wound, and a clamp member for fixing the magnetic tape to the tape clamp portion; and at least either a surface of the tape clamp portion or an inside surface of said tape clamp member is roughened with an average surface roughness Rz of 7 µm or less.

According the first magnetic tape cartridge of the present invention, at least either the surface of the tape clamp portion or the inside surface of said tape clamp member is roughened with an average surface roughness Rz of 7 µm or less. Therefore, even if the surface of magnetic tape has a low coefficient of friction, the roughened surface will enhance the frictional resistance between itself and the magnetic tape and will increase the clamping force between itself and the magnetic tape. Thus, disengagement of the tape leader pin from the magnetic tape can be prevented and reliability can be assured.

In accordance with the present invention, there is provided a second magnetic tape cartridge comprising:

a cartridge case in which a single reel with magnetic tape wound thereon is rotatably housed and a leader pin coupled with a leading end of the magnetic tape is caught by a pin catching member of a recording-reproducing unit and is inserted into a tape leader opening formed in the cartridge case; and a pin retaining spring member which elastically engages the leader pin so that the leader pin is detachably retained at a predetermined position within the cartridge case;

wherein a wall surface is provided in the cartridge case so that when the leader pin is inserted into the cartridge case, displacement of the pin retaining member due to the engagement of the pin retaining member with the leader pin is regulated within a predetermined range.

In the second magnetic tape cartridge, the aforementioned pin retaining member has an elastic arm portion, and the aforementioned wall surface faces the elastic arm member with a predetermined space and is approximately perpendicular to a direction in which the elastic arm portion is displaced. The predetermined space is set within an elastic limit of the elastic arm portion. Furthermore, the aforementioned wall surface may have a configuration which corresponds to a pin retaining portion formed in an outer end of the elastic arm portion, and may have a protruding portion which faces the pin retaining portion with a predetermined space.

According the second magnetic tape cartridge of the present invention, the wall surface is provided in the cartridge case so that when the leader pin is inserted into the cartridge case, displacement of the pin retaining member due to the engagement of the pin retaining member with the leader pin is regulated within a predetermined range. Therefore, in the case of employing a pin retaining member equipped with a short elastic arm portion which does not require a large installation space, plastic deformation of the elastic arm portion can be prevented.

Therefore, an abutting portion, for receiving the flange portion of the tape leader pin and regulating movement of the tape leader pin during engagement, can be formed in the pin housing recess near the pin retaining member. Thus, even if the tape leader pin is pushed toward the front surface of the cartridge case when the pin catching member engages the tape leader pin during the loading operation, movement of the tape leader pin toward the case front surface can be prevented by the abutting surface formed near the pin retaining member and therefore the tape leader pin can be prevented from being moved out of the pin housing recess or tilting. Since the tape leader pin can be correctly held by the pin catching member, a reliable loading operation can be performed and operational reliability can be assured.

In accordance with the present invention, there is provided a third magnetic tape cartridge comprising:

a cartridge case having upper and lower cases fastened together;

a single reel, rotatably housed within the cartridge case, which has magnetic tape wound thereon;

a leader pin, coupled with a leading end of the magnetic tape, which has upper and lower flange portions at both ends;

upper and lower pin retaining spring members which elastically engage the upper and lower flange portions of the leader pin so that with an axis of the leader pin directed in a vertical direction, the leader pin is detachably retained between the upper and lower cases;

the leader pin being constructed so that it is caught by a pin catching member of a recording-reproducing unit and moved out of the cartridge case and that it is returned into the cartridge case by the pin catching member;

wherein the upper and lower pin retaining members have different spring characteristics so that when the leader pin is returned into the cartridge case, one of the pin retaining members starts engaging with the flange portion of the leader pin earlier than the other.

In the third magnetic tape cartridge of the present invention, the upper and lower pin retaining members may have upper and lower elastic arm portions which differ in at least one of wall thickness, shape, or material so that the different spring characteristics are obtained. Furthermore, the upper and lower pin retaining members may have upper and lower elastic arm portions which are equipped with upper and lower pin retaining portions bent at difference angles so that the different spring characteristics are obtained.

According the third magnetic tape cartridge of the present invention, the upper and lower pin retaining members have different spring characteristics so that when the leader pin is returned into the cartridge case, one of the pin retaining members starts engaging with the flange portion of the leader pin earlier than the other. This can prevent the pin catching member from being caught on the pin retaining member and make possible smooth engagement between the pin leader pin and the pin retaining member.

BRIEF DESCRIPTION OF THE DRAWINGS

The present invention will be described in further detail with reference to the accompanying drawings wherein:

FIG. 11 is a sectional view showing the case where a wall facing the elastic arm portion of the pin retaining member of FIG. 9 is vertical;

FIG. 12 is a diagram used for explaining how the elastic arm portion is displaced when a wall facing the elastic arm portion is an inclined surface;

FIG. 13 is a plan view showing a variation of the pin retaining member shown in FIG. 7;

FIG. 15 is a sectional view taken substantially along ling XV—XV of FIG. 14;

FIG. 18 is a side view showing a variation of the pin retaining member;

FIGS. 19A and 19B are plan views showing another variation of the pin retaining member.

DESCRIPTION OF THE PREFERRED EMBODIMENTS

Figure 3:
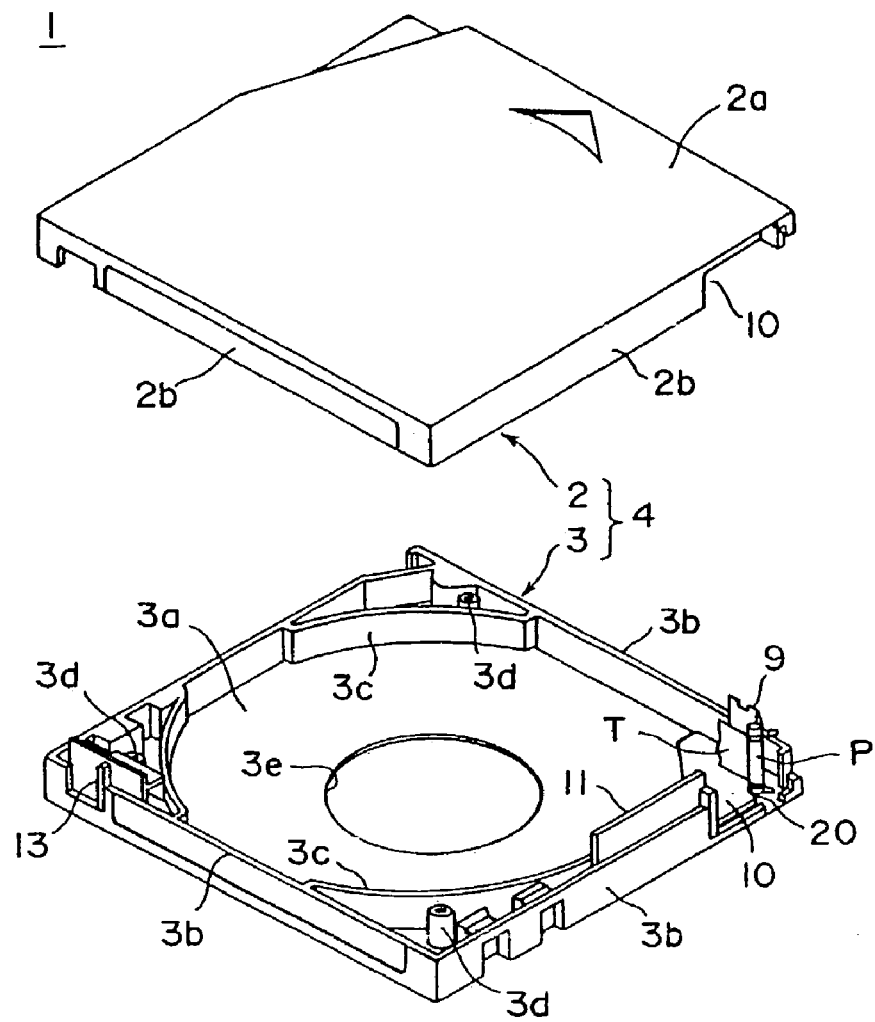
FIG. 3 is an exploded perspective view showing a magnetic tape cartridge constructed according a first embodiment of the present invention.

Referring now in greater detail to the drawings and initially to FIG. 3, there is shown a magnetic tape cartridge 1 in accordance with a first embodiment of the present invention. The magnetic tape cartridge 1 has a cartridge case 4, formed by fastening an upper case 2 and a lower case 3 together with small bolts. A single tape reel 7 with magnetic tape T coupled at its leading end with a tape leader pin P is rotatably housed within the cartridge case 4. A tape leader opening 10 for leading the magnetic tape T is formed in one side wall 2b of the upper case 2 and one side wall 3b of the upper case 3. This tape leader opening 10 is opened and closed by a slide door 11 urged in a closing direction by means of a spring (not shown). A door rail 12 in the form of a groove (see FIGS. 9 and 10) along which the slide door 11 slides is formed near the tape leader opening 10.

The upper and lower cases 2 and 3 are approximately rectangular in shape, and upper and lower side walls 2a and 3a are provided on the circumferences of the top and bottom walls 2b and 3b. The upper and lower cases 2 and 3 further have arcuate inside walls 3c (shown only for the lower case 2) extending along the outer periphery of the tape reel 7. The upper and lower cases 2 and 3 are fastened together by small bolts, with the four boss portions 3d (only three are shown) of the lower case 3 in contact with the boss portions (not shown) of the upper case 2.

A center hole 3e is formed in the central portion of the lower case 3 to rotate the tape reel 7 by the drive shaft of a drive unit (not shown). A write inhibit member 13 is disposed on the rear end portion so that it is slidable. The tape reel 7 is provided at the central portion thereof with a rotation regulating mechanism 15 for restrict rotation of the tape reel 7 when it is not used.

Although not shown, a reel plate is attached on the bottom surface of the tape reel 7 to retain a magnet type rotation drive means on the central portion of the tape reel 7. The outer peripheral portion of the tape reel 7 is provided with a reel gear which meshes with the drive gear of the rotation drive means. When the reel gear and the drive gear are in a meshed state, the rotation regulating means 15 is released so that the paper reel 7 is free to rotate.

In the magnetic tape cartridge 1, the tape leader pin P is retained in a pin housing recess 20 formed near the tape leader opening 10, with the magnetic tape T completely wound on the tape reel 7 when not being used. This housing recess 20 is continuous to an insertion guide portion 21 (see FIG. 10). The insertion guide portion 21 is constructed so that the end portion of the tape leader pin P can be guided to the pin housing recess 20. Also, there is disposed a pin retaining member 9 consisting of a plate spring member. The pin retaining member 9 is used for detachably retaining the tape leader pin P in the pin housing recess 20.

Figure 4:
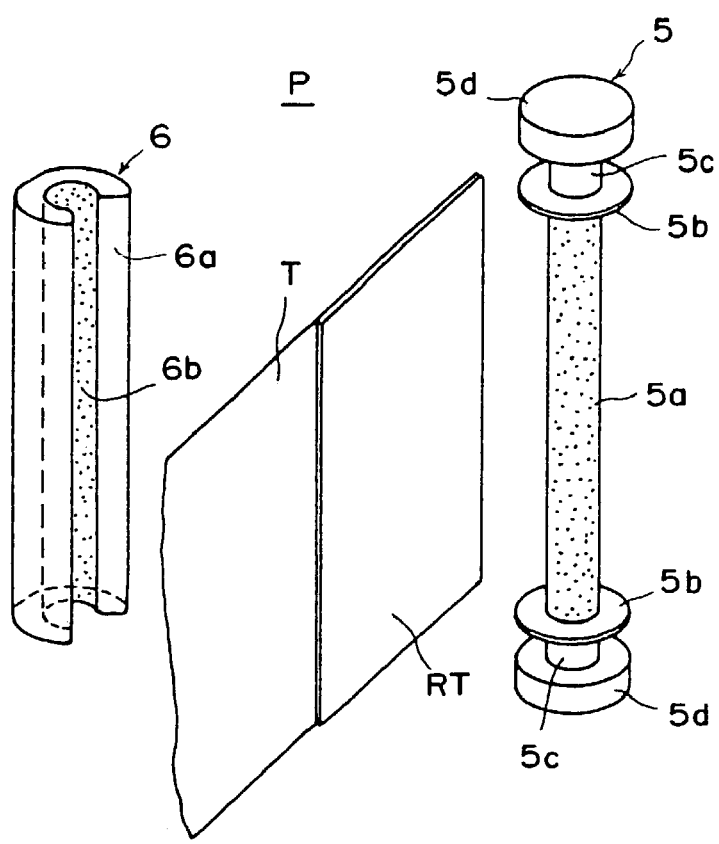
FIG. 4 is a perspective view showing the tape leader pin of the magnetic tape cartridge of FIG. 3 and the magnetic tape to be coupled with the tape leader pin.

The tape leader pin P consists of a pin main body 5 and a clamp member 6, as illustrated in FIG. 4. The pin main body 5 has a tape clamp portion 5a in the form of a shaft at its central portion. The tape clam portion 5a is used to clamp the end portion of the magnetic tape T between it and the clamp member 6. The pin main body 5 also has flange portions 5b in the form of a thin plate at the upper and lower ends of the tape clamp portion 5a. In addition, small-diameter portions 5c, which are engaged and retained by the pin catching member of a recording-reproducing unit, are formed outside the flange portions 5b. Furthermore, relatively thick flange portions 5d for engaging with the cartridge case 4 are formed at the opposite ends of the pin main body 5. The pin main body 5 is formed, for example, from bar stainless steel by cutting, and the length of the tap clamp portion 5a corresponds to the width of the magnetic tape T.

The surface of the tape clamp portion 5a of the pin main body 5 is roughened with an average surface roughness Rz of 7 μm or less. The roughening increases the frictional resistance between the surface of the tape clamp portion 5a and the magnetic tape T, so the force of clamping the magnetic tape T enhances. The roughening of the tape clamp portion 5a is performed by knurling, etc.

The clamp member 6 is a resin molded product and has an axial length which corresponds to the length of the tape clamp portion 5a of the pin main body 5. This clamp member 6 is provided with an axial slit 6a extending over the overall length thereof and has a C-shaped cross section. The width of the slit 6a is narrower than the outside diameter of the tape clamp portion 5a. Therefore, if the clamp member 6 is inserted elastically on the outer periphery of the tape clamp portion 5a while being deformed so that the slit 6a is outstretched, the inner peripheral surface 6a of the clamp member 6 is pressed against the outer periphery of the tape clamp portion 5a, and the magnetic tape T is clamped between the inner peripheral surface 6a of the clamp member 6 and the outer periphery of the tape clamp portion 5a.

The inner peripheral surface 6a of the clamp member 6 is roughened with an average surface roughness Rz of 7 μm or less. The roughening increases the frictional resistance between the inner peripheral surface 6b and the magnetic tape T, so the clamping force enhances. The roughening of the inner peripheral surface 6b is performed by a sand blasting process for a molding die, etc.

As shown in FIG. 4, reinforcement tape RT may be stuck on the outside surface or inside surface of the leading end portion of the magnetic tape T which is coupled with the pin main body 5. For example, in the clamped state shown in FIG. 5, the top surface of the reinforcement tape RT contacts the surface of the tape clamp portion 5a, while the outside surface of the magnetic tape T contacts the inner peripheral surface 6b of the clamp member 6. In this case, at least the inner peripheral surface 6b of the clamp member 6 which contacts the magnetic tape T is roughened as described above. On the other hand, in the case where the reinforcement tape RT is stuck on the outside surface of the magnetic tape T, the tape clamp portion 5a of the pin main body 5 is roughened as described above. Furthermore, both the surface of the tape clamp portion 5a and the inner peripheral surface 6a of the clamp member 6 may be roughened.

According to the first embodiment, at least either the surface of the tape clamp portion 5a or the inner peripheral surface 6a of the clamp member 6 is roughened. Therefore, in the case where the pin main body 5 is coupled to the leading end portion of the magnetic tape T by inserting the clamp member 6 on the pin main body 5, the coefficient of friction between the pin main body 5 (and/or the clamp member 6) and the magnetic tape T becomes high and the magnetic tape T is clamped with increased frictional force. Thus, the magnetic tape cartridge can be prevented from becoming unusable due to disengagement of the tape leader pin P from the magnetic tape T.

Figure 5:
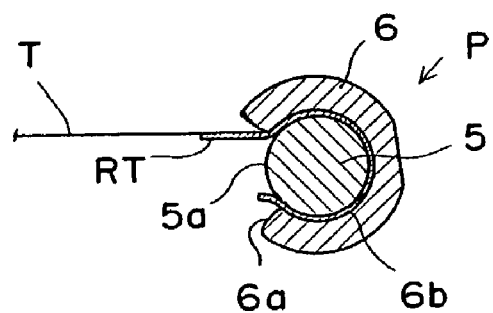
FIG. 5 is a sectional view showing the state in which the tape leader pin and magnetic tape of FIG. 4 are coupled with each other.
Figure 6:
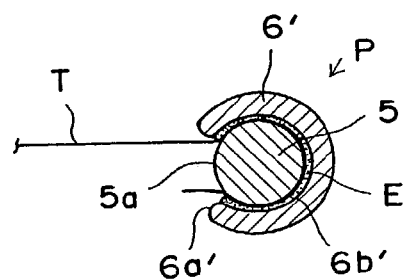
FIG. 6 is a sectional view showing the state in which a variation of the tape leader pin of FIG. 4 are coupled with the magnetic tape.

FIG. 6 illustrates a clamp member 6' differing from that shown in FIGS. 4 and 5.

The clamp member 6' is made of steel and has a C-shaped cross section. This clamp member 6' has an axial length that corresponds to the length of the tape clam portion 5a of the pin main body 5. The clamp member 6' is provided with an axial slit 6a' extending over the overall length thereof. The width of the slit 6a' is greater than the outside diameter of the tape clamp portion 5a. The clamp member 6' is inserted on the outer periphery of the tape clamp portion 5a through the slit 6a'. Then, the slit 6a' is caulked to clamp the magnetic tape T between the clamp member 6' and the tape clamp portion 5a. Also, elastomer E is interposed between the inner peripheral surface 6b' the clamp member 6' and the magnetic tape T wound on the outer periphery of the tape clamp portion 5a.

The elastomer E is used for preventing the magnetic tape T from being damaged when the clamp member 6' is caulked. A natural or synthetic polymer having elastic properties, such as natural rubber and synthetic rubber, is used. The elastomer E is coated beforehand on the inner peripheral surface 6b' of the clamp member 6'.

As with the aforementioned case, the surface of the tape clamp portion 5a of the pin main body 5 is roughened with an average surface roughness Rz of 7 μm or less. The roughening increases the frictional resistance between the tape clamp portion 5a and the magnetic tape T, so the force of clamping the magnetic tape T enhances.

The surface of the tape clamp portion 5a of the pin main body 5, or the inner peripheral surface 6a' of the clamp member 6', is roughened with an average surface roughness Rz of 7 μm or less by various roughening methods. On the other hand, if the surface is roughened to greater than the upper limit, particularly in the case where the surface of the tape clamp portion 5a or the surface of the molding die for the clamp member 6 is roughened by a sand blasting process, the very small protrusions on the roughened surface will be damaged and therefore the problem of dust will arise. Therefore, it is preferable that the average surface roughness Rz be 7 μm or less and further preferable that it be about 3 μm or less.

Figure 7:
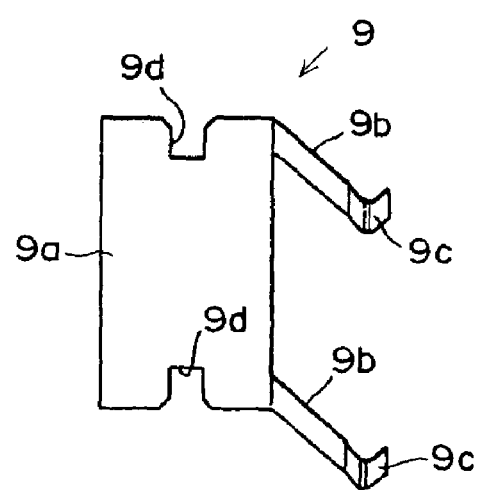
FIG. 7 is a perspective view showing a pin retaining member provided in the magnetic tape cartridge of FIG. 3.
Figure 9:
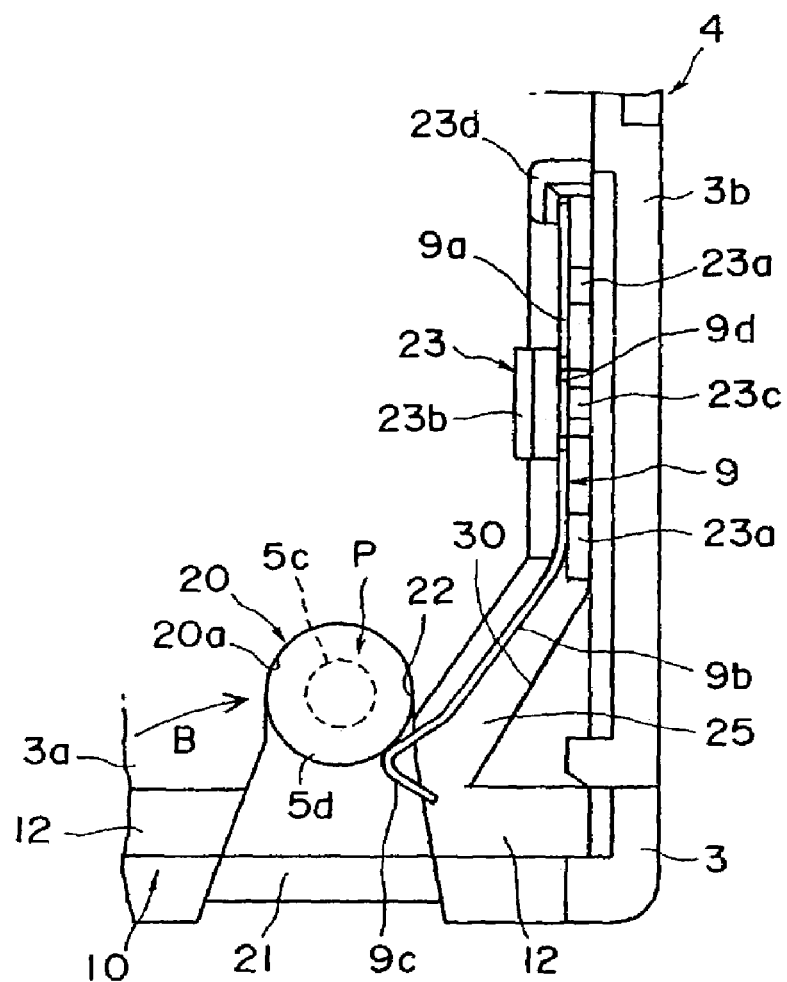
FIG. 9 is a plan view showing the tape leader opening, the upper case having been removed.
Figure 10:
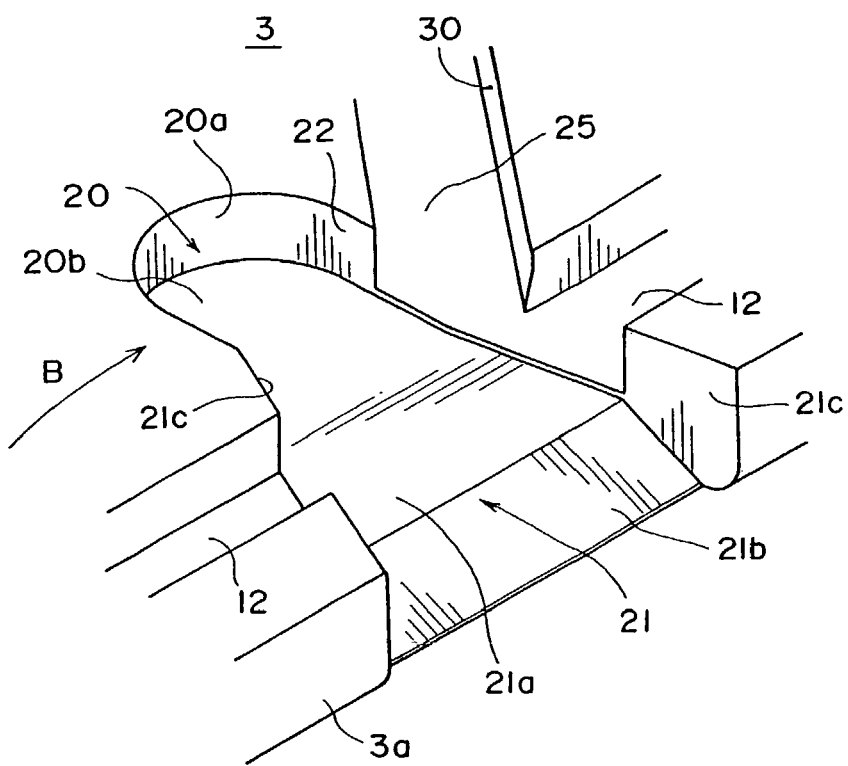
FIG. 10 is an enlarged perspective view showing the pin housing recess of FIG. 9.

As shown in FIG. 7, the pin retaining member 9 has an attaching portion 9a in the form of a rectangular plate. With the upper case 2 and the lower case 3 fastened together, the retaining portion 9a is engaged and held by a spring holding portion 23 provided near the case side walls (front walls) 2b and 3b, as shown in FIG. 9 (although the upper case 2 is not shown, it is symmetrical with the lower case). The pin retaining member 9 also has a pair of elastic arm portions 9b extending obliquely from the upper and lower end portions of the attaching portion 9a toward the tape leader pin P. The elastic arm portions 9b have pin retaining portions 9c at their outer ends, respectively. The pin retaining portions 9c elastically abut the outer peripheries of the upper and lower flange portions 5d of the pin main body 5 of the tape leader pin P.

The pin retaining portions 9c are bent so that they project toward the tape leader pin P. If the tape leader pin P inserted into the tape leader opening 10 is brought into contact with the outer inclined surfaces of the pin retaining portions 9c, the elastic arm portions 9b are elastically deformed and the tape leader pin P is retained within the pin housing recess 20 by the inner inclined surfaces of the pin retaining portions 9c. In addition, engaging recesses 9d are provided in the top and bottom edges of the attaching portion 9a.

The spring holding portion 23 for holding the pin retaining member 9 is equipped with ribs 23a formed on the inside surfaces of the side walls (front walls) 2b and 3b of the upper and lower cases 2 and 3, and a protrusion 23b formed between the ribs 23a and on the bottom surface. If the attaching portion 9a of the pin retaining member 9 is inserted between the ribs 23a and the protrusion 23b, the engaging recess 9d is fitted on a protruding portion 23c on the bottom surface. In this manner, the pin retaining member 9 is held by the spring holding portion 23. Furthermore, the spring holding portion 23 is provided with a tilt regulating portion 23d for holding the proximal portion of the attaching portion 9a of the pin retaining member 9 remote from the elastic arm portion 9b in an upright state.

Figures 1A, 1B:
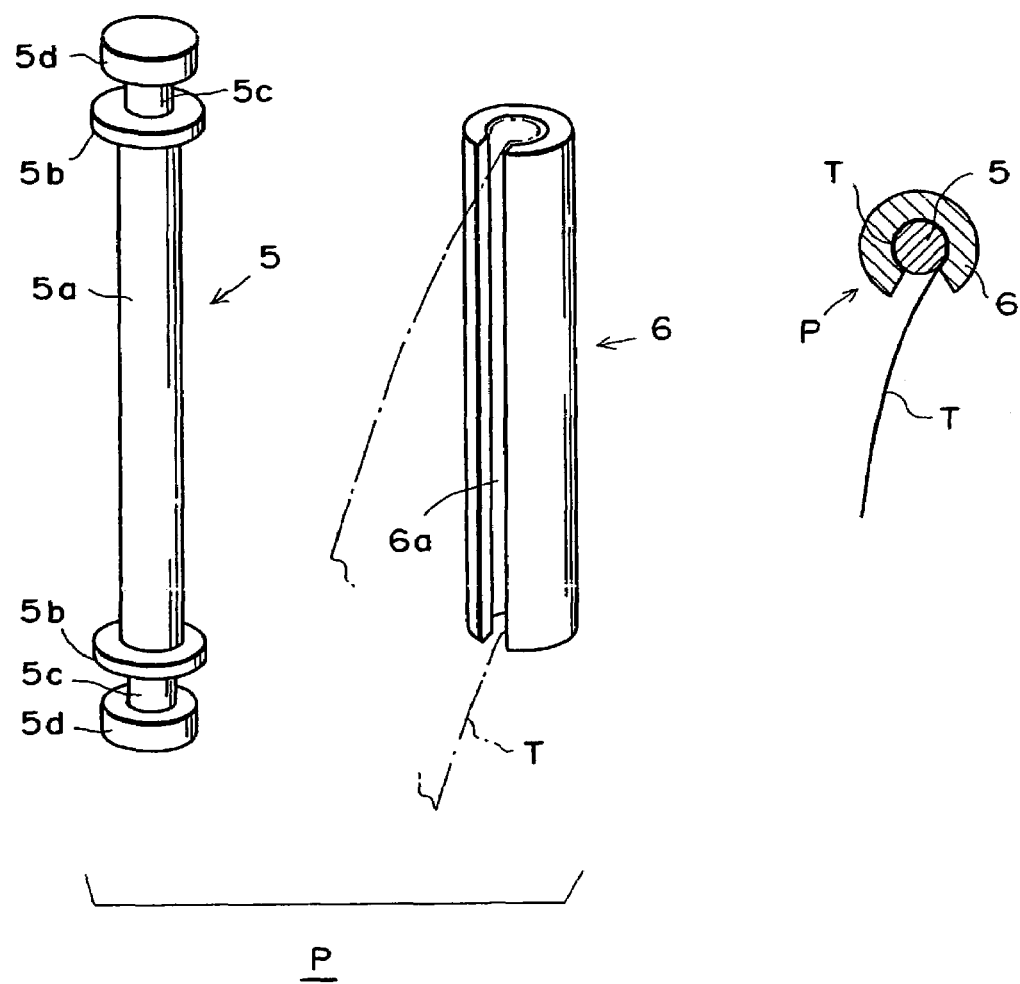
FIG. 1A is an exploded perspective view showing a tape leader pin which is equipped in a magnetic tape cartridge.
FIG. 1B is a sectional view showing the state in which the tape leader pin is coupled with magnetic tape.
Figure 2:
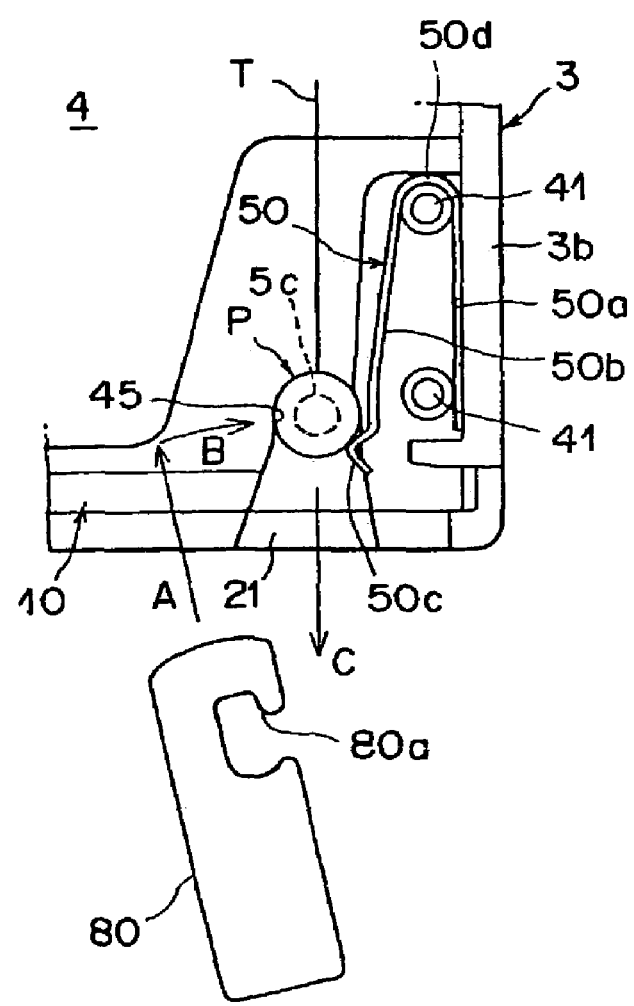
FIG. 2 is a plan view showing a conventional magnetic tape cartridge, the upper case having removed to show a loading operation.
Figure 8:
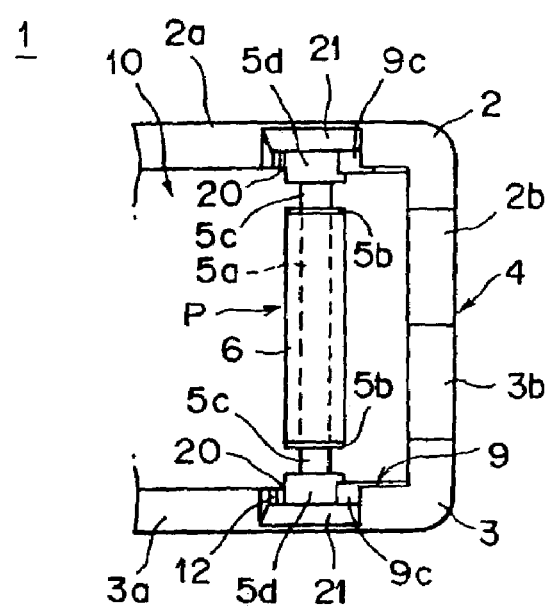
FIG. 8 is a front view showing the state in which a slide door in the magnetic tape cartridge of FIG. 3 has been opened to show a tape leader opening.

The pin housing recess 20 is formed into a U shape by a peripheral surface 20a and a flat bottom surface 20b. The peripheral surface 20a is formed by a semicircular surface and parallel surfaces extending from the opposite ends of the semicircular surface. The height or depth of the peripheral surface 20a is lower than that of the flange portion 5d of the tape leader pin P, as illustrated in FIG. 8. The arcuate surface of the peripheral surface 20a has a bore diameter which corresponds to the outside diameter of the flange portion 5d of the tape leader pin P so that the tape leader pin P housed is held in the center position thereof. The peripheral surface 20a further has a support portion 22 which abuts the flange portion 5d of the tape leader pin P to regulate movement of the tape leader pin P when the tape leader pin P is pushed in a right direction in FIG. 9 by the rotational movement of the pin catching member 80 (see FIG. 2) of a recording-reproducing unit in the direction of arrow B that is performed during the loading operation.

The insertion guide portion 21, disposed closer to the tape leader opening 10 than to the pin housing recess 20, has a flat surface 21a, continuous to the bottom surface 20b of the housing recess 20, and an inclined surface 21b. The insertion guide portion 21 further has side surfaces 21c at the opposite sides. The side surfaces 21c widen in width toward the tape leader opening 10 and are connected to the peripheral surface 20a of the pin housing recess 20. A door rail 12 is formed in the side surfaces 21c near the tape leader opening 10. An oblique recess 25 is formed in the inclined surface 21c on the case front side (right side of FIG. 10) to install the pin retaining member 9 and is provided so that the pin retaining-portion 9c of the elastic arm portion 9b can abut the flange portion 5d of the tape leader pin P.

As shown in FIG. 11, a wall surface of the oblique recess 25 remote from the pin housing recess 20 extends approximately vertically from the bottom surface of the recess 25 and forms a vertical wall surface 30 which faces the elastic arm portion 9b of the pin retaining member 9 through a space W. Even if the elastic arm portion 9b is forcibly pushed when the tape leader pin P is inserted into the tape leader opening 10, the elastic arm portion 9b will abut the vertical wall surface 30 and therefore further displacement of the elastic arm portion 9b will be prevented. The space W is set within the elastic limit of the elastic arm portions 9b so that the upper and lower arm portions 9b are prevented from being plastically deformed at the boundary portion between the attaching portion 9a and the upper arm portion 9b and the boundary portion between the attaching portion 9a and the lower arm portion 9b.

In the case where the wall surface facing the elastic arm portion 9b is not the vertical wall surface 30 but an inclined wall surface 31 such as that shown in FIG. 12, incidentally, the elastic arm member 9b will be moved upward along the inclined wall surface 31 by the pushing force exerted on the tape leader pin P and will exceed its elastic limit. Consequently, there is a possibility that the elastic arm portion 9b will no longer return to the original position.

In addition, instead of the vertical wall surface 30, a protruding portion 32 may be provided so that it faces a pin retaining portion 9c formed in the outer end of the elastic arm portion 9b of the pin retaining member 9, as shown in FIG. 13, for example. The protruding portion 32 has a configuration which corresponds to the pin retaining portion 9c curved convexly toward the tape leader pin P, and extends toward the pin retaining portion 9c.

According to the first embodiment, as described above, the vertical wall surface 30 or protruding portion 32 is provided in the cartridge case 4 so that when the magnetic tape cartridge 1 is unloaded, the displacement of the elastic arm portion 9b by the tape leader pin P can be regulated within a predetermined range. Thus, even in the case of employing the pin retaining member 9 equipped with short elastic arm portions 9b which do not require a large installation space, plastic deformation of the elastic arm portion 9b can be prevented. Therefore, the abutting portion 22 for receiving the tape leader pin P to regulate movement of the tape leader pin P during engagement can be formed on a side, near the pin retaining member 9, of the pin housing recess 20. This prevents the tape leader pin P from being moved out of the housing recess 20 or tilting when the pin catching member rotates and engages with the tape leader pin during the loading operation. Thus, the loading operation can be performed with reliability.

FIGS. 14 to 17 illustrate a magnetic tape cartridge constructed according to a second embodiment of the present invention.

A tape leader pin P in the second embodiment has the same construction as that shown in FIG. 4. The upper and lower flange portions 5d of the tape leader pin P are inserted into recesses 45, formed in the bottom surface of the top wall of an upper case 2 and the top surface of the bottom wall of a lower case 3. Also, the upper and lower flange portions 5d are detachably retained by a pin retaining member 60, clamped between the upper and lower cases 2 and 3, which consists of a plate spring member.

Figure 14:
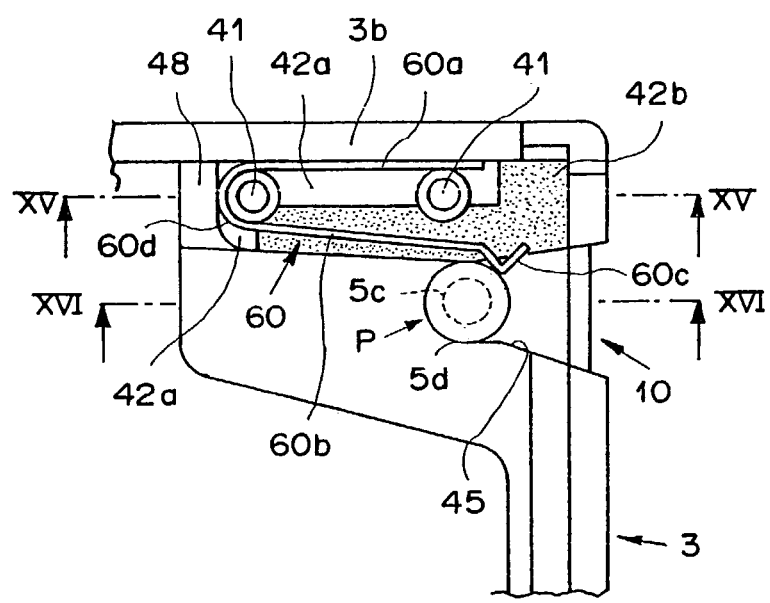
FIG. 14 is a plan view showing a magnetic tape cartridge constructed according a second embodiment of the present invention, the upper case having been removed.
Figure 17:
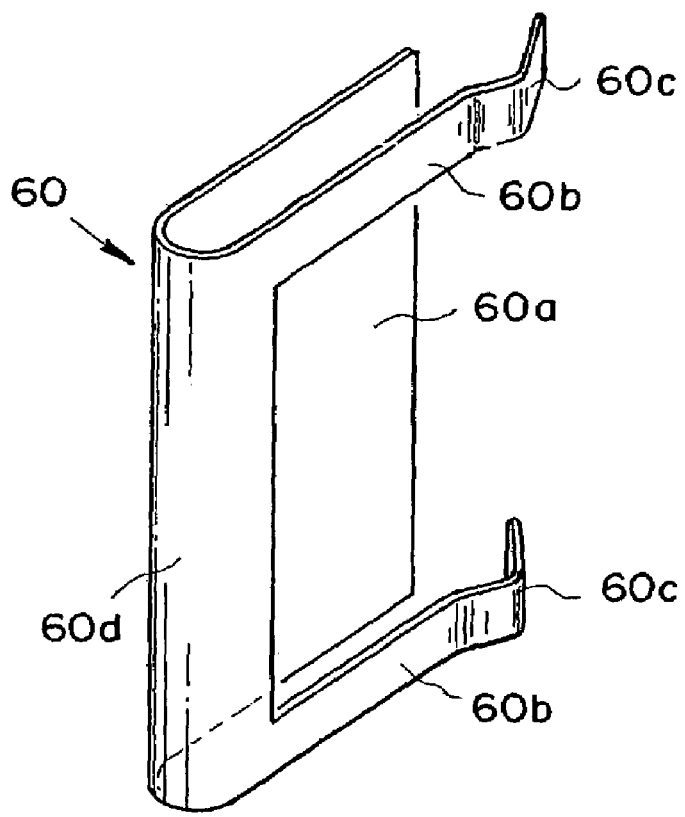
FIG. 17 is a perspective view of the pin retaining member of FIG. 14.

As illustrated in FIG. 17, the pin retaining member 60 is constructed integrally by an attaching portion 60a in the form of a flat plate, a connecting portion 60d in the form of a semi cylinder connected to one end of the attaching portion 60a, a pair of parallel elastic arm portions 60b extending horizontally from the upper and lower end portions of the connecting portion 60d, and pin retaining portions 60c formed in the outer ends of the arm portions 30b. The pin retaining member 60 has a hairpin-shaped cross section, as shown in FIG. 14. The upper and lower pin retaining portions 60c and 60c are bent at predetermined angles, respectively. If the outer peripheries of the flange portions 5d of the tape leader pin P are brought into contact with the outer inclined surfaces of the bent portions of the upper and lower pin retaining portions 60c and 60c, the arm portions 60b and 60b are deflected and the flange portions 5d are retained within the recesses 45 by the inner inclined surface of the bent portions. However, the bent portions of the upper and lower pin retaining portions 60c differ in angle. For example, in the embodiment shown in FIG. 17, the lower pin retaining portion 60c is bent more acutely than the upper pin retaining portion 60c. As a result, when the tape leader pin P is returned into the cartridge case 1, the upper pin retaining portion 60c starts engaging with the flange portion 5d earlier than the lower pin retaining portion 60c.

The upper edges of the connecting portion 60d and attaching portion 60a of the pin retaining member 60 are on the same plane as the upper edge of the upper arm portion 60b, and the lower edges of the connecting portion 60d and the attaching portion 60a are on the same plane as the lower edge of the lower arm portion 60b. The upper and lower edges of the attaching portion 60a and connecting portion 60d of the pin retaining member 60 constitute a portion for fixing the pin retaining member 60 to the cartridge case 4.

On the other hand, in a portion for attaching the pin retaining member 60, which is provided in the upper and lower cases 2 and 3 of the cartridge case 4, two cylindrical bosses 41 are projected from the top surface of the bottom wall 3a of the lower case 3 along the inside wall surface of the side wall 3b of the lower case 3 with a predetermined space, as shown in FIGS. 14 and 15 which show the attaching portion for the pin retaining member 60, provided in the lower case 3. In addition, between the bosses 41 and the inside wall surface of the side wall 3b of the lower case 3, there is provided a first narrow gap into which the lower end portions of the attaching portion 60a and connecting portion 60d of the pin retaining member 60 are fitted. Furthermore, between a protruding portion 48 and the inner boss 41, there is provided a second narrow gap 47 (see FIG. 15) into which the lower end portion of the connecting portion 60d is fitted. With this arrangement, the pin retaining member 60 is attached on the lower case 3, with the lower end portions of the attaching portion 60a and the connecting portion 63d fitted into the aforementioned first gap and second gap 47, as shown in FIG. 14.

As shown in FIGS. 14 and 15, in the top surface of the bottom wall 3a of the lower case 3, there is difference in level between a first wall surface region 42a which receives the lower edges of the attaching portion 60a and connecting portion 60d of the pin retaining member 60, and a second wall surface region 42b (shadowed in FIG. 14) which faces the lower edge of the lower arm portion 60b of the pin retaining member 60. That is, the second wall surface region 42b is formed into a concave shape with respect to the first wall surface region 42a.

Therefore, there is formed a gap between the second wall surface region 42b and the lower edge of the lower arm portion 60b. For this reason, even when the lower arm portion 60b is deflected, there is no possibility that it will contact the top surface of the bottom wall 3a of the lower case 3. Therefore, the operation of the lower arm portion 60b stabilizes and the top surface of the bottom wall of the lower case 3 can be prevented from being shaved off by deflection of the lower arm portion 60b.

Figure 16:
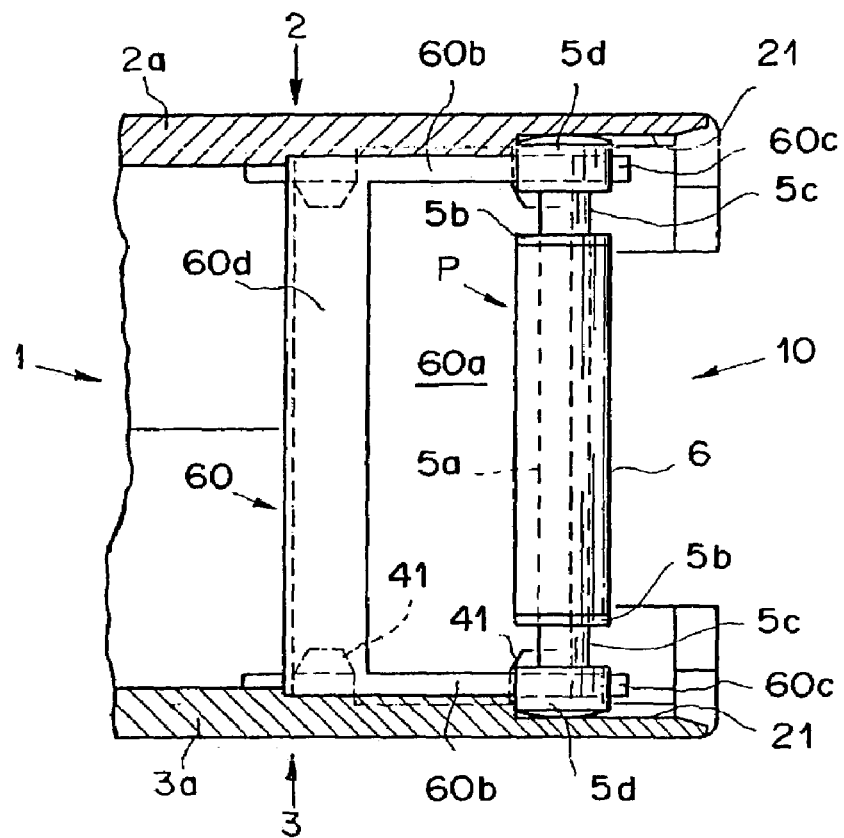
FIG. 16 is a sectional view of the magnetic tape cartridge in FIG. 14 taken substantially along ling XVI—XVI of FIG. 14.

Although illustration and explanation are omitted, the portion in the upper case 2 for attaching the pin retaining member 60 is symmetrical in construction with the portion in the lower case 3 for attaching the pin retaining member 60, as shown in FIG. 16. Therefore, even when the upper arm portion 60b is deflected, there is no possibility that it will contact the bottom surface of the top wall 2a of the upper case 2. As a result, the operation of the upper arm portion 60b stabilizes and the bottom surface of the top wall 2a of the upper case 2 can be prevented from being shaved off by deflection of the upper arm portion 60b.

In the above-mentioned construction, the installation of the pin retaining member 60 into the cartridge case 4 can be performed by fastening the upper and lower cases 2 and 3 together, and the installation is satisfactorily performed. In addition, since the upper and lower flange portions 5d of the tape leader pin P can be retained by the single pin retaining member 60, a reduction in the number of components results in cost reduction. Furthermore, the angled portions of the upper and lower pin retaining portions 60c differ in angle so that when the tape leader pin P is returned into the cartridge case 1, the pin retaining portions 60c start engaging with the flange portions 5d at difference times. Therefore, smooth engagement of the pin retaining member 60 with the tape leader pin P becomes possible.

FIG. 18 illustrates a variation of the pin retaining member 60. The upper and lower arm portions 60b are formed so that they differ in shape. Similarly, the upper and lower pin retaining portions 60c are formed so that they differ in shape. The upper and lower arm portions 60b may be formed so that they differ in wall thickness.

Figures 20A, 20B:
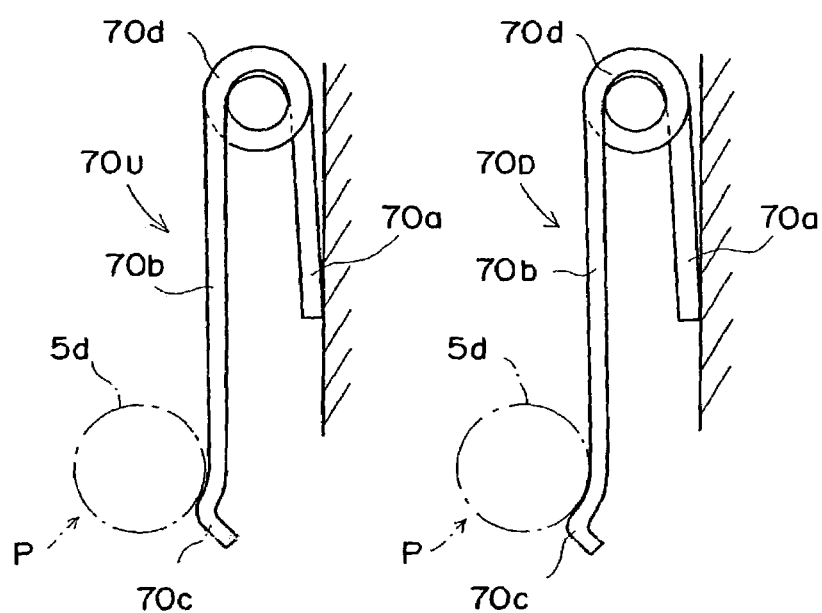
FIGS. 20A and 20B are plan views showing still another variation of the pin retaining member.

FIGS. 19 and 20 illustrate upper and lower torsion coil type pin retaining members 70 formed separately. FIGS. 19A and 20A show an upper pin retaining member $70_U$ for retaining the upper flange portion 5d of the tape leader pin P, while FIGS. 19B and 20B show a lower pin retaining member $70_D$ for retaining the lower flange portion 5d of the tape leader pin P.

In the pin retaining members $70_U$ and $70_D$, a coil portion 70d, an attaching portion 70a and an arm portion 70b extending from the coil portion 70d, and a pin retaining portion 70c formed at the outer end of the arm portion 70b, are formed by a single line spring member. In FIG. 19, the upper and lower pin retaining members $70_U$ and $70_D$ are equipped with the coil portions 70d differing in diameter from each other. In FIG. 20, the upper and lower pin retaining members $70_U$ and $70_D$ are equipped with the pin retaining portions 70c differing in shape from each other. That is, the upper and lower pin retaining members $70_U$ and $70_D$ differ in spring characteristic. Furthermore, the upper and lower pin retaining members $70_U$ and $70_D$ may be formed into the same shape with different spring materials. All cases will be satisfied if one of the pin retaining portions 70c of the upper and lower pin retaining members $70_U$ and $70_D$ starts engaging with the flange portion 5d of the tape leader pin P earlier than the other.

While the present invention has been described with reference to the preferred embodiments thereof, the invention is not to be limited to the details given herein, but may be modified within the scope of the invention hereinafter claimed.

What is claimed is:

1. A magnetic tape cartridge comprising:
   a cartridge case in which a single reel with magnetic tape wound thereon is rotatably housed and a leader pin coupled with a leading end of said magnetic tape is caught by a pin catching member of a recording-reproducing unit and is inserted into a tape leader opening formed in said cartridge case, said cartridge case having a floor surface with a first recess such that a portion of said leader pin is disposed within said first recess; and
   a pin retaining spring member which elastically engages said leader pin so that said leader pin is detachably retained at a predetermined position within said cartridge case;
   wherein a second recess is provided in said floor surface of said cartridge case such that said pin retaining spring member resides in said second recess, said second recess including a wall surface so that when said leader pin is inserted into said cartridge case, displacement of said pin retaining spring member due to the engagement of said pin retaining spring member with said leader pin is regulated within a predetermined range,
   wherein said pin retaining spring member has an elastic arm portion that is displaced by said leader pin, and said wall surface being positioned such that said elastic arm portion is abutted against said wall surface in a first position and is separated from said wall surface in a second position, and
   wherein said wall surface is slanted with respect to an outer side wall of said cartridge and extends in a linear direction along said elastic arm portion for a distance which is greater than an outer diameter of said leader pin.

2. A magnetic tape cartridge as set forth in claim 1, wherein said wall surface faces said elastic arm portion with a predetermined space and is approximately perpendicular to a direction in which said elastic arm portion is displaced.

3. A magnetic tape cartridge as set forth in claim 2, wherein said predetermined space is set within an elastic limit of said elastic arm portion.

4. A magnetic tape cartridge as set forth in claim 1, wherein
   said wall surface has a configuration which corresponds to a pin retaining portion formed in an outer end of said elastic arm portion, and has a protruding portion which faces said pin retaining portion with a predetermined space.

5. A magnetic tape cartridge as set forth in claim 1, wherein said first recess is U-shaped.

6. A magnetic tape cartridge as set forth in claim 1, wherein said first recess has a peripheral surface and a flat bottom surface, such that said peripheral surface is formed by a semi-circular surface and parallel surfaces extending from opposite ends of said semi-circular surface.

7. A magnetic tape cartridge as set forth in claim 1, wherein said first recess has a peripheral surface in an arcuate shape which corresponds to an outside of said leader pin.

8. A magnetic tape cartridge as set forth in claim 1, wherein said first recess comprises a guide portion having side surfaces which widen in width toward an opening for said leader pin.

9. A magnetic tape cartridge as set forth in claim 1, wherein said second recess forms a channel in a bottom surface of said cartridge case.

10. A magnetic tape cartridge as set forth in claim 1, wherein said second recess is adjacent said first recess.

11. A magnetic tape cartridge as set forth in claim 1, wherein said elastic arm portion is positioned within said second recess.

12. A magnetic tape cartridge as set forth in claim 1, wherein said first and second recesses both extend downwardly from a same plane.

13. A magnetic tape cartridge as set forth in claim 1, wherein the cartridge case includes a peripheral side wall such that said wall surface is positioned between said peripheral side wall and said pin retaining spring member.

* * * * *